UNITED STATES PATENT OFFICE.

FERDINAND SCHÄCKE, OF COLOGNE, GERMANY.

METHOD OF MAKING MANURE.

993,463.

No Drawing.

Specification of Letters Patent.   Patented May 30, 1911.

Application filed August 12, 1907. Serial No. 388,241.

*To all whom it may concern:*

Be it known that I, FERDINAND SCHÄCKE, civil engineer, a subject of the German Emperor, and residing at Lütticherstrasse 64, Cologne-on-the-Rhine, Germany, have invented a new and useful Method of Making Manure, of which the following is a specification.

Eruptive rocks containing at least 4% of potash, such as trachyte, phenolites, leucite-basalts, leucite-basanites, leucitites, syenites, lavas or mixtures of these rocks or of rocks, in which these minerals are contained, are finely ground, the degree of fineness depending largely on the period within which the manure is to take effect, and are then intimately mixed with finely ground natural or artificial substances, such as caustic lime, nitrate of lime, lime saltpeter, carbonate of lime, gypsum or other materials, which on being decomposed, supply calcium compounds. The materials are ground to such degree of fineness, that when shaken for half an hour on a smooth sieve of wire of 0.1 mm. diameter, with 37 meshes per cm. (1369 pr. sq. cm.) at least 75% of fine meal are obtained. This mixture is introduced into the soil to be manured, whereupon, by the dampness of the soil, potash is set free, and silicate of lime is formed, the process being similar to that which takes place when volcanic rocks are used as hydraulic material in combination with quick lime. For normal purposes quick lime is added in such proportion as is required to approximately establish molecular equivalence with the bases contained in the ground rock. By "normal purposes" is meant for ordinary action as a potash manure. With nitrate of lime, lime saltpeter, etc., the action is not merely that of a potash manure, but that of a nitrate of lime manure, or of a mixture such as "Thomas meal" which is an artificial phosphate manure containing about 50% of lime.

In a soil which already contains lime to an extent above the normal, there may be used a lower mixing proportion than the one arrived at by calculation, that is to say a reduced quantity of lime. If the soil is poor in lime this is no detriment to the action of the manure. For improving the other properties of such a soil a normal manuring with lime may precede the addition of this manure. But this is not absolutely necessary, there may also be used a mixture containing more lime, and the soil will become richer in lime by repeated manuring with manures of this kind. If nitrate of lime, carbonate of lime, gypsum or other salt of lime is used, the mixture is such that the oxid of calcium contained in it is present in the proportion above mentioned. With carbonate of lime or gypsum the action is slower; with lime containing magnesia it is less slow; slowness of action is often an advantage, inasmuch as one manuring serves for a long time.

When using nitrate of lime, so that the oxid of calcium is first formed by the decomposition and acts *in statu nascendi* (at the moment of being formed), the action is accelerated which may be of an advantage for rapid growths. The use of calcium compounds containing nitrogen has, moreover, the advantage that a potash-nitrogen manure is produced.

The proportions of the ingredients cannot be stated in terms of a unit of weight, because they vary according to the chemical composition of the volcanic rock used, and depend on the proportions of pure caustic lime, carbonate of lime, nitrate of lime or other lime-compounds in the rock. The proportions are calculated according to the atomic weights of potassium, sodium, silica and lime, so that the silicic acid with which the potassium and sodium are bound in the rock is bound with calcium oxid (lime), the potassium and sodium being liberated. No general rule can be stated, the proportions being determined in each case by the result of chemical analysis. The essential points are the proportions of potassium, sodium, and lime, the proportion of magnesia being also taken into account, if present.

What I claim as my invention and desire to secure by Letters Patent of the United States is:—

1. The method of preparing manure from calcium salts and eruptive rocks of the later periods, such as herein described, which consists in intimately mixing together said finely pulverized rocks, and calcium salts in approximately the proportions of one atom of calcium to two atoms of the alkali metals present, said mixture being capable of use as a fertilizer without further treatment, and yielding its potash in an available form, substantially as described.

2. The method of preparing manure from calcium nitrate and eruptive rocks of the later periods, such as herein described, which consists in intimately mixing together said finely pulverized rocks, and calcium nitrate in approximately the proportions of one atom of calcium to two atoms of the alkali metals present, said mixture being capable of use as a fertilizer without further treatment, and yielding its potash in an available form, substantially as described.

In witness whereof I have signed this specification in the presence of two witnesses.

FERDINAND SCHÄCKE.

Witnesses:
 LOUIS VANDORY,
 M. KNEPPERS.